(12) United States Patent
Mahadevan et al.

(10) Patent No.: US 11,516,123 B2
(45) Date of Patent: Nov. 29, 2022

(54) CONFIGURING LOGICAL NETWORK DEVICES FOR LABEL-SWITCHED NETWORKS

(71) Applicant: Arista Networks, Inc., Santa Clara, CA (US)

(72) Inventors: Vijay Mahadevan, Milpitas, CA (US); Max Xiao, Vancouver (CA); Jesper Skriver, Latsia (CY)

(73) Assignee: ARISTA NETWORKS, INC., Santa Clara, CA (US)

( * ) Notice: Subject to any disclaimer, the term of this patent is extended or adjusted under 35 U.S.C. 154(b) by 60 days.

(21) Appl. No.: 16/694,334

(22) Filed: Nov. 25, 2019

(65) Prior Publication Data
US 2021/0160176 A1 May 27, 2021

(51) Int. Cl.
*H04L 45/50* (2022.01)
*H04L 12/46* (2006.01)
*H04L 45/24* (2022.01)
*H04L 45/00* (2022.01)

(52) U.S. Cl.
CPC ........ *H04L 45/507* (2013.01); *H04L 12/4645* (2013.01); *H04L 12/4679* (2013.01); *H04L 45/245* (2013.01); *H04L 45/66* (2013.01)

(58) Field of Classification Search
CPC . H04L 45/507; H04L 45/245; H04L 12/4679; H04L 45/66; H04L 12/4645; H04L 45/50; H04L 12/4641
See application file for complete search history.

(56) References Cited

U.S. PATENT DOCUMENTS

| | | | | |
|---|---|---|---|---|
| 8,953,590 B1* | 2/2015 | Aggarwal | ........... | H04L 12/4675 370/409 |
| 10,523,466 B1* | 12/2019 | Sivaraj | ................ | H04L 61/1547 |
| 2004/0202171 A1* | 10/2004 | Hama | ................. | H04L 12/4641 370/395.1 |
| 2007/0115913 A1* | 5/2007 | Li | ......................... | H04L 47/724 370/349 |
| 2012/0033672 A1* | 2/2012 | Page | ..................... | H04L 45/245 370/395.53 |
| 2014/0153403 A1* | 6/2014 | Allan | ...................... | H04L 45/12 370/238 |
| 2018/0091419 A1* | 3/2018 | Bickhart | ................. | H04L 45/50 |
| 2018/0351862 A1* | 12/2018 | Jeganathan | ............. | H04L 45/02 |
| 2019/0305988 A1* | 10/2019 | Bickhart | .............. | H04N 21/812 |

OTHER PUBLICATIONS

Title: "Configuring MC-LAG on EX9200 Switches in the Core for Campus Networks" Publisher: Juniper Networks (Year: 2015).*

* cited by examiner

*Primary Examiner* — John A Follansbee
*Assistant Examiner* — Kamal M Hossain
(74) *Attorney, Agent, or Firm* — Fountainhead Law Group P.C.

(57) ABSTRACT

Techniques for configuring a logical network switch in label-switched networks are provided. In some embodiments, a first network device in a label-switched network is configured with a network address. A second network device in the label-switched network is configured with the same network address. The first network device is configured to use a set of labels for a set of virtual local area networks (VLANs). The second network device is configured to use the same set of labels for the same set of VLANs. The configured first and second network devices appear as a logical network device from the perspective of other network devices in the label-switched network.

20 Claims, 7 Drawing Sheets

270

| Forwarding Table |
|---|
| Entry 1 |
| Entry 2 |
| Entry 3 |
| ⋮ |
| 275 — VLAN ID 90, MAC Address B → Port Channel 100 |

| | |
|---|---|
| 282 — MAC Address | B |
| 284 — Label | 1000 |
| 286 — Next Hop IP Address | 2.2.2.2 |

| Forwarding Table |
|---|
| Entry 1 |
| Entry 2 |
| ⋮ |
| 295 — VLAN ID 90, MAC Address B → 2.2.2.2, label 1000 |

FIG. 2D

CONFIGURING LOGICAL NETWORK DEVICES FOR LABEL-SWITCHED NETWORKS

BACKGROUND

Network devices are generally used to facilitate the exchange of data and resources between devices connected to a network. Typically, network devices have hardware resources that are used to process data, forward data, bridge networks together, provide compatibility between networks, etc. Because network devices have a fixed amount of hardware resources, more hardware resources are utilized as the scale of the networks in which the network devices are deployed increases in order to support the larger scale of the networks. Some solutions can address this problem by adding even more hardware resources to the network device. Other solutions may employ technique for optimizing the use of the hardware resources.

BRIEF DESCRIPTION OF THE DRAWINGS

FIGS. 2A-2D illustrates various aspects of an example media access control (MAC) learning operation performed in the network illustrated in FIG. 1 according to some embodiments.

DETAILED DESCRIPTION

In the following description, for purposes of explanation, numerous examples and specific details are set forth in order to provide a thorough understanding of the present disclosure. It will be evident, however, to one skilled in the art that various embodiments of the present disclosure as defined by the claims may include some or all of the features in these examples alone or in combination with other features described below, and may further include modifications and equivalents of the features and concepts described herein.

Described herein are techniques for configuring logical network devices in label-switched networks. In some embodiments, several network devices in a label-switched network (e.g., a multiprotocol label switching (MPLS) network) may be configured to appear, from the perspective of other network devices in the label-switched network, as a single logical network device. This way, hardware resources of the other network devices in the label-switched network are utilized less compared to when the several network devices are configured to act as individual network devices.

In some embodiments, each of the several network devices are configured in a particular way to allow them to operate as if they are a single network device in the label-switched network. For example, each of the several network devices may be configured with the same next hop IP address that is used for a routing protocol that network devices in the label-switched network utilizes to exchange routing information with each other. As another example, each of the several network devices can be configured to use the same labels for the same corresponding virtual local area networks (VLANs). By configuring the several network devices in such manner, the several network devices can act as a single network device from the perspective of other network devices in the label-switched network.

1. Example Network

Figure 1:
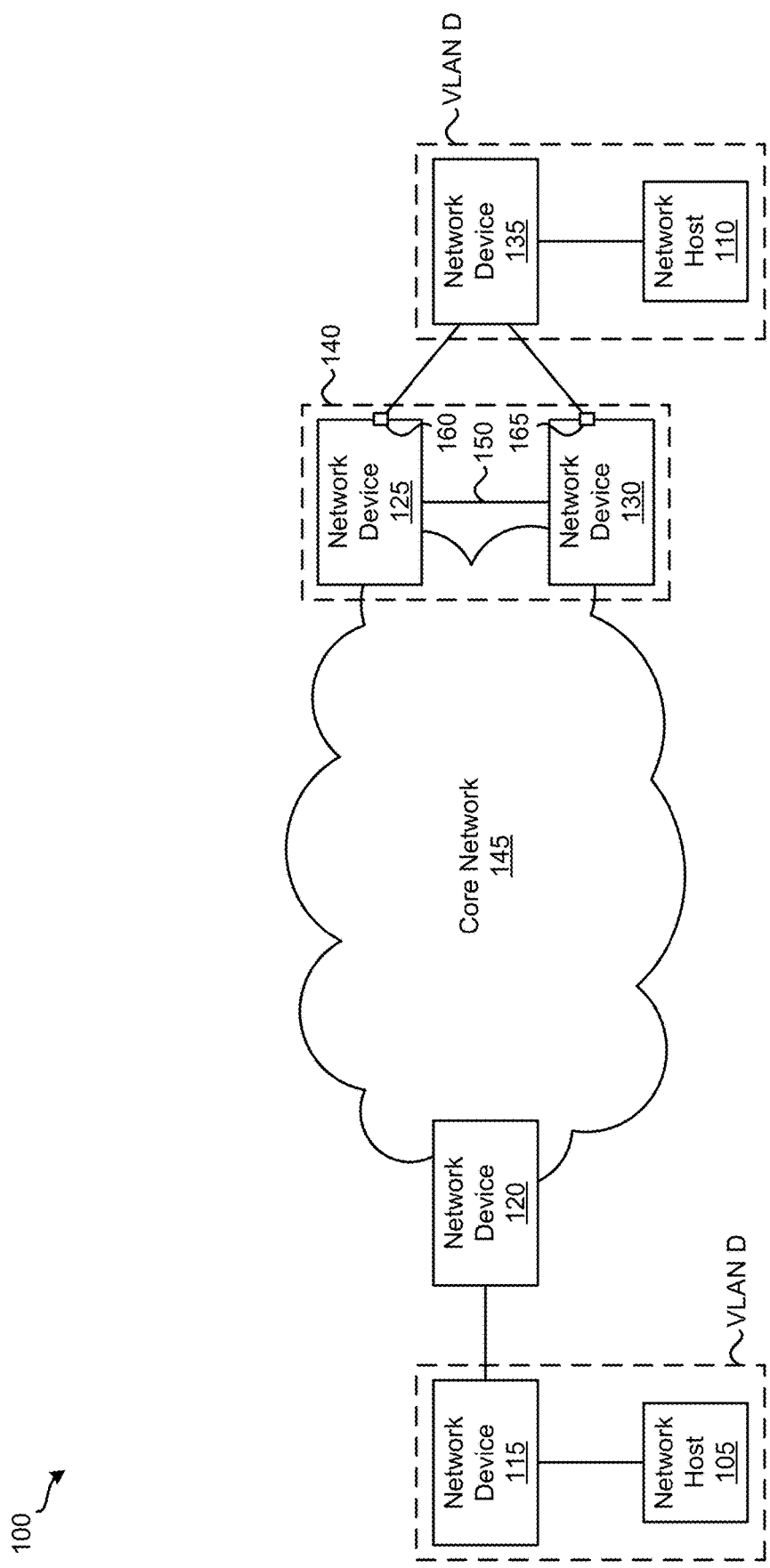
FIG. 1 illustrates a network according to some embodiments.

FIG. 1 illustrates a network 100 according to some embodiments. As shown, network 100 includes network hosts 105 and 110, network devices 115-135, logical network device 140, and core network 145. In some embodiments, core network 145 is a network that connects other networks (e.g., local area networks (LANs), wide area networks (WANs), subnetworks, access networks, etc.) together by facilitating the exchange of information between such other networks. Such a network may be referred to as a backbone network. In this example, core network 145 is implemented as a label-switched network (e.g., an MPLS network). As such, core network 145 includes one or more network devices (not shown) that are configured to route data (e.g., Ethernet frames, packets, etc.) through core network 145 based on labels. One of ordinary skill in the art will understand that core network 145 may be implemented using any other type of core network technology. Each of the network hosts 105 and 110 may be a computing device (e.g., a desktop computer, a laptop, a smartphone, a tablet, a server, etc.) configured to send data to and receive data from each other, among other network hosts in network 100 (not shown).

Network devices 115-135 may each be configured to forward data through network 100. For this example, network devices 120-130 are provider edge network devices and core network 145 is a provider core network. That is, network devices 120-130 are located at the edge of core network 145. In addition, network devices 115 and 135 are customer edge network devices. As mentioned above, core network 145 is implemented as a label-switched network in this example. Since network devices 115 and 135 are not part of core network 145, they do not perform any functions based on labels (e.g., label switching, routing based on labels, etc.). Additionally, FIG. 1 shows that network host 105, network host 110, network device 115, and network device 135 are included in the same VLAN, which is referred to as VLAN D.

As illustrated in FIG. 1, network 100 also includes logical network device 140, which is formed by network devices 125 and 130. From the perspective of network device 120, network devices 125 and 130 appear as a single network device (i.e., logical network device 140). In this example, network devices 125 and 130 are configured as a multi-chassis link aggregation group (MLAG). As an MLAG pair, network devices 125 and 130 each has an MLAG agent that is configured to synchronize state (e.g., MAC tables) with each other via an MLAG peer link 150 (e.g., an MLAG peer link port channel) between network device 125 and network device 130.

FIG. 1 also illustrates that network device 135 is connected to both network device 125 and network device 130. This may be referred to as a multi-homing configuration. In this configuration, port 160 on network device 125 and port 165 on network device 130 are configured as port channels that form a single logical port channel connected to network device 135. For this example, port 160 on network device 125 can be configured as port channel 100 and port 165 on network device 130 can also be configured as port channel 100, which collectively form a single logical port channel. The logical connection between logical network device 140 (i.e., the connection between network device 125 network device 135 and the connection between network device 130 and network device 135) can be assigned a logical identifier. Such a logical identifier can be referred to as an Ethernet segment identifier (ESI) or an MLAG identifier (MLAG-ID). For instance, the connections may be assigned an ESI of 10. With this configuration, network device 135 can simultaneously utilize the bandwidth of both links with network devices 125 and 130. If one of the network devices 125/130 fails, network device 135 still has a connection with the other network device 130/125.

2. Example MAC Learning

Figure 2A:
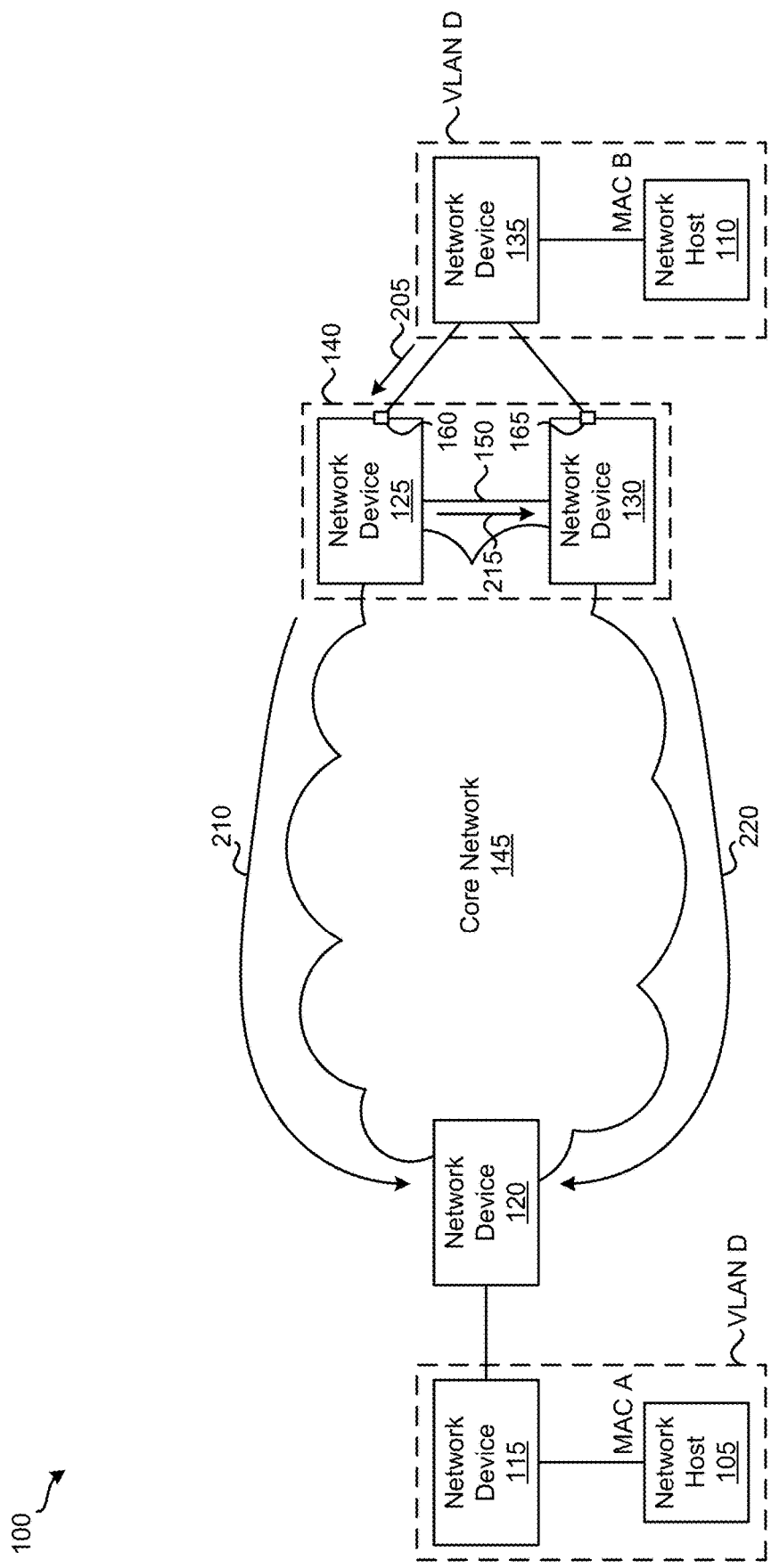

An example operation of network 100 will now be described by reference to FIGS. 2A-2D. FIG. 2A illustrates network 100 during a media access control (MAC) address learning operation. Specifically, network device 120 is learning the MAC address of network host 110. As shown in FIG. 2A, in this example, the MAC address of network host 105 is MAC address A and the MAC address of network host 110 is MAC address B. In addition, network devices 120, 125, and 130 are configured to learn MAC addresses using an Ethernet virtual private network (EVPN) standard over a routing protocol (e.g., a border gateway protocol (BGP)) to exchange MAC routes that they learn. Unlike traditional MAC address learning that uses a flooding mechanism in the data plane, the MAC address learning in this example occurs in the control plane of network devices 120, 125, and 130 by virtue of using the EVPN standard over the routing protocol.

The operation starts by network device 125 receiving, at 205, an Ethernet frame that includes a VLAN identifier associated with VLAN D and the MAC address B of network host 110. At this point, network device 125 has not learned MAC address B. Thus, in response to receiving the Ethernet frame, network device 125 learns MAC address B in VLAN D by storing in its forwarding table (e.g., a MAC table) an entry that specifies the VLAN identifier associated with VLAN D, MAC address B, and a port channel identifier for the port channel that forms the single logical port channel connected to network device 135 (i.e., the port channel identifier for the port channel configured for port 160 of network device 125).

FIG. 2B illustrates a forwarding table 270 of network device 125 after network device 125 learns MAC address B according to some embodiments. As shown, forwarding table 270 includes several entries. In this example, entry 275 is the one that network device 125 adds to forwarding table 270 to learn MAC address B. As explained above, the entry that network device 125 stores in its forwarding table to learn MAC address B specifies the VLAN identifier associated with VLAN D, MAC address B, and a port channel identifier for the port channel that forms the single logical port channel connected to network device 135 (i.e., the port channel identifier for the port channel configured for port 160 of network device 125). As illustrated in FIG. 2B, entry 275 specifies a VLAN ID of 90 (which is the VLAN ID used for VLAN D for this example), MAC address B, and port channel 100. So when network device 125 performs a lookup on forwarding table 270 to determine how to forward data (e.g., an Ethernet frame) and, based on the lookup, network device 125 determines to use entry 275 to forward the data (e.g., by determining that the VLAN ID and MAC address included in the data matches the VLAN ID and MAC address specified in entry 275), network device 125 will forward the data out port channel 100 (i.e., port 160 of network device 125), as specified in entry 275.

Returning to FIG. 2A, after learning MAC address B, network device 125 allocates a label for VLAN D, which, in this example, is a label value of 1000. As such, when network device 125 receives data encapsulated with a label value of 1000, network device 125 can associate the data with VLAN ID 90. Next, network device 125 advertises, at 210, a MAC route for MAC address B to network device 120 using the EVPN standard over the routing protocol. In this example, network device 125 is configured with a next hop Internet Protocol (IP) address of 2.2.2.2 for the purpose of the routing protocol. The MAC route network device 125 advertises to network device 120 includes MAC address B, the allocated label for VLAN D, and network device 125's next hop IP address of 2.2.2.2.

FIG. 2C illustrates an example of a MAC route 280 that is advertised using a routing protocol according to some embodiments. For this example, MAC route 280 is for MAC address B. Additionally, network device 125 advertises MAC route 280 to network device 120 using the EVPN standard over the routing protocol. As shown, MAC route 280 includes fields 282-286. Field 282 is configured to store a MAC address of the MAC route (MAC address B in this example). Field 284 is configured to store a label value allocated for the VLAN ID associated with the MAC route, which is label value 1000 in this example. Field 286 is configured store the next hop IP address (2.2.2.2 in this example) of the network device advertising MAC route 280 (network device 125 in this example).

Referring back to FIG. 2A, at 215, network device 125 sends network device 130, via MLAG peer link 150, MAC address B, VLAN ID 90, and the unique identifier of the logical connection with network device 135 (i.e., the ESI). In response to receiving this information, network device 130 learns MAC address B by storing in its forwarding table (e.g., a MAC table) an entry that specifies VLAN ID 90, MAC address B, and a port channel identifier for the port channel that forms the single logical port channel connected to network device 135 (i.e., the port channel identifier for the port channel configured for port 165 of network device 130). Next, network device 130 allocates a label for VLAN ID 90. For this example, network device 130 allocates the same label value 1000 for VLAN ID 90. Then, network device 130 advertises, at 220, the MAC route for MAC address B to network device 120 using the EVPN standard over the routing protocol. In this example, network device 130 is also configured with a next hop Internet Protocol (IP) address of 2.2.2.2 for the purpose of the routing protocol. The MAC route network device 130 advertises to network device 120 includes MAC address B, the allocated label for VLAN D, and network device 130's next hop IP address of 2.2.2.2.

When network device 120 receives the advertised MAC route from network device 125, network device 120 learns MAC address B by storing in its forwarding table (e.g., a MAC table) an entry that specifies VLAN ID 90, MAC address B, a tunnel end point, and the label for VLAN ID 90. When network device 120 receives the advertised MAC route from network device 130, network device 120 determines that the MAC route for MAC address B is already learned. While the example operation describes learning MAC address B for network host 110, the same or similar method may be used to learn MAC address A for network host 105.

FIG. 2D illustrates a forwarding table 290 of network device 120 after network device 120 learns MAC address B according to some embodiments. As illustrated in FIG. 2D, forwarding table 290 includes several entries. For this example, entry 295 is the one that network device 120 adds to forwarding table 290 to learn MAC address B. As mentioned above, the entry that network device 120 stores in its forwarding table to learn MAC address B specifies the VLAN identifier associated with VLAN D, MAC address B, a tunnel end point, and the label for VLAN ID 90. As shown in FIG. 2D, entry 295 specifies a VLAN ID of 90 (which is the VLAN ID used for VLAN D for this example), MAC address B, IP address 2.2.2.2, and label 1000. IP address 2.2.2.2 is the next hop IP address of network address 125 that network device 125 advertised to network device 120 for MAC route 280. This IP address is the tunnel end point to which data is to be forwarded in this example. Label 1000 is the label value allocated by network device 125, which was also advertised by network device 125 to network device 120 for MAC route 280. Now when network device 120 performs a lookup on forwarding table 290 to determine how to forward data (e.g., an Ethernet frame) and, based on the lookup, network device 120 determines to use entry 295 to forward the data (e.g., by determining that the VLAN ID and MAC address included in the data matches the VLAN ID and MAC address specified in entry 295), network device 120 will encapsulate the data with a label value or 1000 and forward the encapsulated data through the tunnel terminated at IP address 2.2.2.2, as specified in entry 295.

3. Example Data Processing

Figure 3:
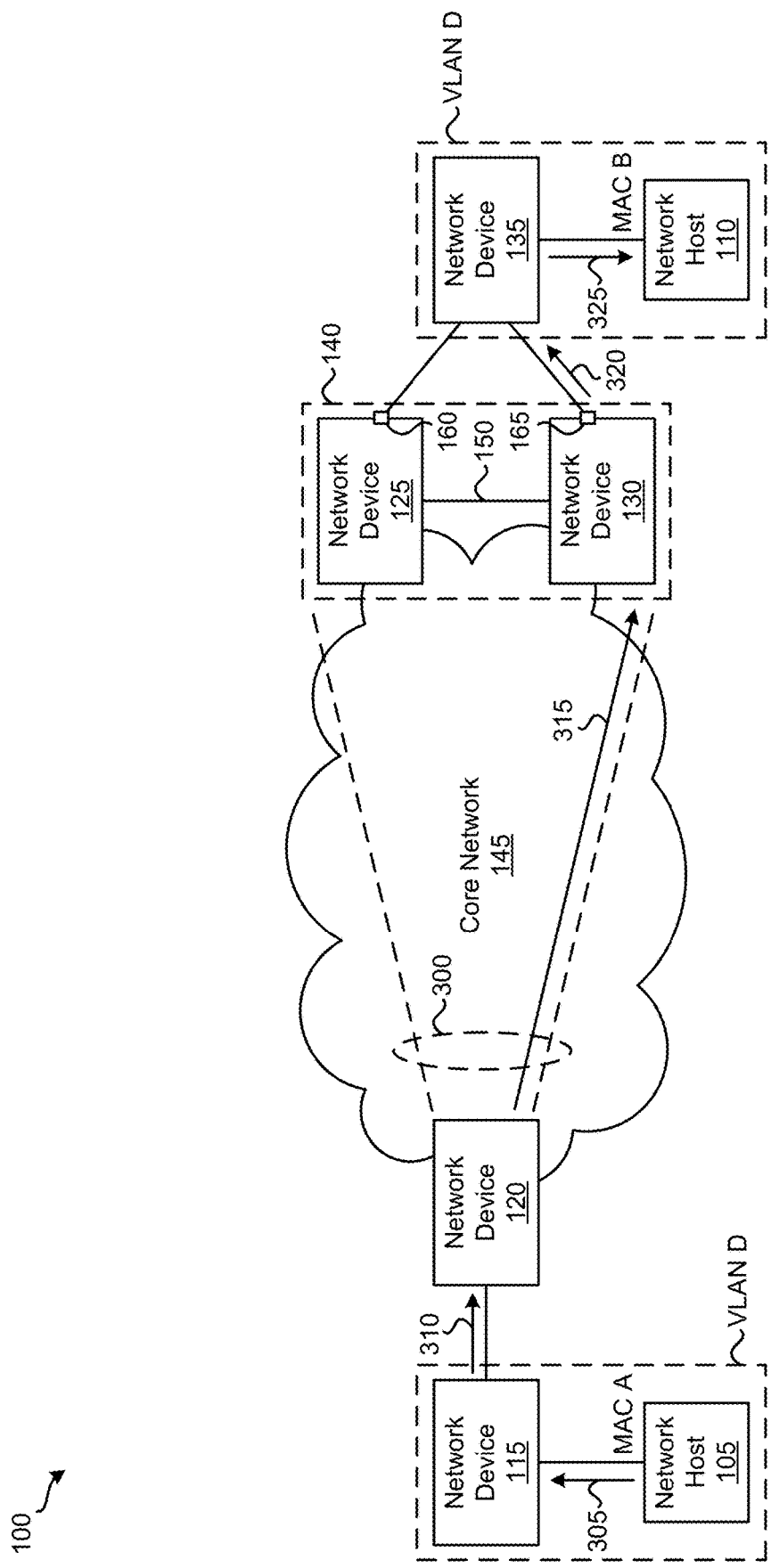
FIG. 3 illustrates an example data processing operation performed in the network illustrated in FIG. 1 according to some embodiments.
Figure 4A:
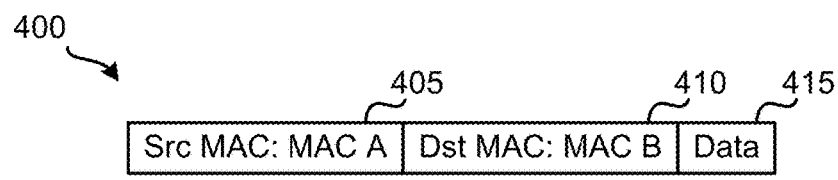
FIG. 4A-4C illustrate example Ethernet frames transmitted through the network illustrated in FIG. 1 according to some embodiments.

Another example operation of network 100 will now be described by reference to FIGS. 3 and 4A-4C. This example operation shows how a frame traverses through network 100 once network devices 115-135 have learned MAC addresses A and B, the MAC address of network hosts 105 and 110, respectively. The operation begins by network host 105 sending, at 305, an Ethernet frame to network device 115 that is destined for network host 110. FIG. 4A illustrates a simplified version of the Ethernet frame sent from network device 115 to network device 120. As shown, Ethernet frame 400 includes source MAC address 405, destination MAC address 410, and payload 415. Source MAC address 405 is configured to store the MAC address of the device from which Ethernet frame 400 originated, which, in this example, is MAC address A, the MAC address of network host 105. Destination MAC address 410 is configured to store the MAC address of the device for which Ethernet frame 400 is destined. For this example this MAC address is MAC address B, the MAC address of network host 110. Payload 415 is configured to store the data intended to be transmitted from the source device to the destination device.

When network device 115 receives Ethernet frame 400, network device 115 performs a lookup on its MAC table based on the VLAN ID indicated in Ethernet frame 400 (not shown) and the MAC address stored in destination MAC address 410. In this example, network device 115 determines a matching entry in its MAC table specifying a VLAN ID of 90, a destination MAC address of MAC address B, and an interface coupled to network device 120. Based on the determined MAC table entry, network device 115 forwards, at 310, Ethernet frame 400 to network device 120.

Upon receiving Ethernet frame 400, network device 120 performs a lookup on its MAC table based on the VLAN ID indicated in Ethernet frame 400 and the MAC address stored in destination MAC address 410. For this example, network device 120 determines a matching entry in its MAC table specifying a VLAN ID of 90, a destination MAC address of MAC address B, a label value of 1000 associated with the VLAN ID of 90, and a logical interface that represents tunnel 300. As shown in FIG. 3, network device 120 is one endpoint of tunnel 300 and logical network device 140 is the other endpoint of tunnel 300. Network device 120 encapsulates Ethernet frame 400 with a first label, the label value associated with the VLAN ID of 90. Then, network device 120 encapsulates that with a second label. The second label represents a label-switched path that is used to forward the encapsulated Ethernet frame through core network 145. In this example, the label value for the label-switched path network device 120 is to use to forward the Ethernet frame through core network 145 is 170. In some embodiments, network device 120 receives label-switch paths from other network devices in core network 145 via a label distribution protocol (LDP).

In this example, there are several possible paths from network device 120 to logical network device 140 through tunnel 300. Each of these possible paths have the same cost for this example. The possible paths are referred to as an equal cost multi-path (ECMP) set. In some embodiments, network device 120 determines the ECMP set in this example by receiving an IP route that is advertised along with the MAC route for MAC address B, as described above by reference to operation 210 and receiving an IP route that is advertised along with the MAC route for MAC address B, as described above by reference to operation 220. The IP route advertised from network device 120 includes the local IP address (e.g., 11.0.1.1) of network device 125 as the next hop IP address. The IP route advertised from network device 120 includes the local IP address (e.g., 11.0.2.1) of network device 130 as the next hop IP address. Based on the advertised IP routes, network device 120 determines that there are two paths in an ECMP set that are run through tunnel 300 from network device 120 to logical network device 140. Thus, when network device 120 forwards data originating from network host 105 to network hosts 110, network device 120 may select one of the two ECMP paths in the ECMP set to use to forward the data through tunnel 300 to logical network device 140. This mechanism allows traffic forwarded from network device 120 to logical network device 140 to be load balanced between network devices 125 and 130. Once network device 120 selects one of the ECMP paths, network device 120 determines a next hop that to which data is forwarded so that the data can traverse along the selected ECMP path. For this example, network device 120 determines a next hop for forwarding data to network device 130. Next, network device 120 generates an Ethernet frame with its own MAC address as the source MAC address, the MAC address of the determined next hop as the destination MAC address, and the encapsulated Ethernet frame received from network device 115 as the payload. Network device 120 forwards, at 315, the generated Ethernet frame to the next hop via a port associated with the next hop in order to forward Ethernet frame 400 to network device 130.

Figure 4B:
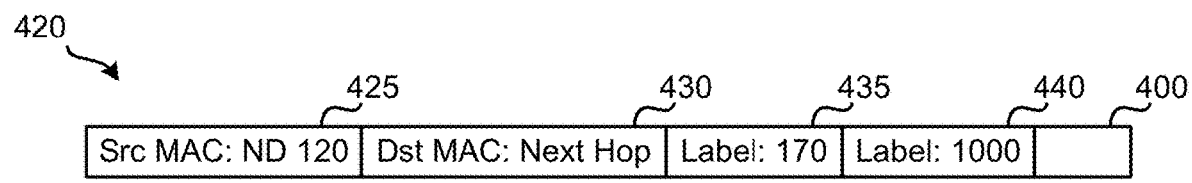

FIG. 4B illustrates a simplified version of the Ethernet frame sent from network device 120 to the next hop. As illustrated in FIG. 4B, Ethernet frame 420 includes source MAC address 425, destination MAC address 430, label 435, label 440, and Ethernet frame 400. Source MAC address 405 is configured to store the MAC address of the device from which Ethernet frame 420 originated, which is the MAC address of network device 120 in this example. Destination MAC address 410 is configured to store the MAC address of the device for which Ethernet frame 400 is destined, which is the next hop for this example. Here, label 435, label 440, and Ethernet frame 400 constitute the payload of Ethernet frame 420. Label 435 (also referred to as an outer label) is configured to store a label-switched path that is used to forward Ethernet frame 400 through core network 145. Label 435 stores the second label described above (label value 170 in this example). Label 440 (referred to as an inner label) is configured to store a label value associated with the VLAN ID to which Ethernet frame 400 belongs. In this example, label 440 stores the first label mentioned above (i.e., the label value associated with the VLAN ID of 90).

Figure 4C:
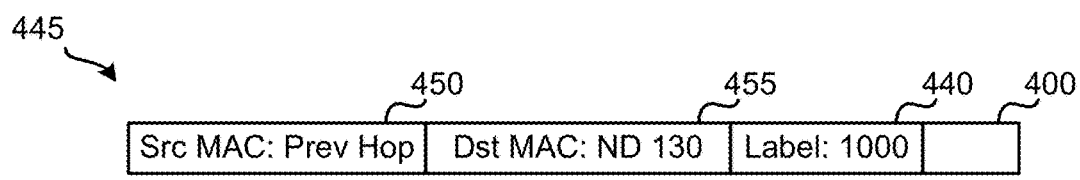

Once the penultimate network device in core network 145 along tunnel 300 receives an Ethernet frame that includes the encapsulated Ethernet frame 400, the penultimate network device performs a lookup on its label forwarding table based on the value in label 435 and determines a matching entry in its label forwarding table specifying a label value of 170, a label pop operation, and an interface of coupled to network device 130. Based on the lookup, the penultimate network device decapsulates the outer label and then generates an Ethernet frame with its own MAC address as the source MAC address, the MAC address of the network device 130 as the destination MAC address, and the decapsulated Ethernet frame as the payload. The penultimate network device forwards the generated Ethernet frame to network device 130 via the interface specified in the entry in the label forwarding table. FIG. 4C illustrates a simplified version of the Ethernet frame sent from the penultimate network device in core network 145 to network device 130. As shown, Ethernet frame 445 includes source MAC address 450, destination MAC address 455, label 440, and Ethernet frame 400. For this example, label 440 and Ethernet frame 400 constitute the payload of Ethernet frame 445.

When network device 130 receives Ethernet frame 445, network device 130 performs a lookup on its label forwarding table based on the value of label 440. For this example, network device 130 determines a matching entry in its label forwarding table specifying a label value of 1000 and a VLAN ID of 90. Then, network device 130 performs a lookup based on the VLAN ID of 90 and the destination MAC address in Ethernet frame 400. Here, network device 130 determines a matching entry in its MAC table specifying a VLAN ID of 90, a destination MAC address of MAC address B, an interface coupled to network device 135. Network device 130 forwards, at 320, Ethernet frame 400 to network device 135 via the interface.

Finally, when network device 135 receives Ethernet frame 400 from network device 130, network device 135 performs a lookup on its MAC table based on the VLAN ID indicated in Ethernet frame 400 and the MAC address stored in destination MAC address 410. For this example, network device 135 determines a matching entry in its MAC table specifying a VLAN ID of 90, a destination MAC address of MAC address B, and an interface coupled to network host 110. Based on the entry, network device 135 forwards, at 325, Ethernet frame 400 to network host 110.

4. Configuring Logical Network Device

FIGS. 1-3 illustrate an example of network devices configured to act as a single logical network device in a label-switched network. The following describes ways to configure such network devices to act as a single logical network device.

4.1 Configuring Routing Protocol IP Address

In some embodiments, network devices that are to act as a single logical network device may each be configured with the same next hop IP address used in a routing protocol for exchanging routing information. When a network device in core network 145 learns a route, it advertises the route to other network devices in core network 145. Part of the information that the network device advertises to other network devices in core network 145 when it a learns the route include a next hop IP address associated with the network device. In some embodiments, a network device provides an interface (e.g., a command-line interface (CLI), a graphical user interface (GUI), an application programming interface (API), etc.) for configuring the network device. In some such embodiments, the next hop IP address of a network device may be configured for a network device by sending appropriate commands via the interface provided by the network device.

4.2 Configuring Label Allocations

As explained above in the data processing example, an Ethernet frame originating from network host 105 and destined for network host 110 is encapsulated with two labels, an inner label and an outer label, before it is forwarded through core network 145. The inner label is a VLAN ID of a VLAN to which the Ethernet frame belongs. The outer label represents a label-switched path that is used to forward the encapsulated Ethernet frame through core network 145. In order for network devices to act as a single logical network device, the network devices can be configured to allocate the same inner label values to the same corresponding VLAN IDs. In other words, the network devices are configured to have the same mappings between inner label values and VLAN IDs.

In some embodiments, an edge network device in core network 145 may be configured to define VLAN identifiers for VLANs. For example, network hosts 105 and 110 belong to the same VLAN D. Therefore, edge network devices 120-130 are each configured to handle network traffic belonging to VLAN D. In order to do so, each of the network devices 120-130 are configured to define a VLAN identifier for VLAN D. Similarly, network devices in core network 145 that are configured to act as a single logical network device are each configured to define VLAN identifiers for VLANs for which they are to handle traffic. Next, the network devices are each configured to reserve the same defined range of label values for VLAN identifiers. In some embodiments, to allocate a label value from the range of label values for a defined VLAN identifier, a network device determines a label value in the range of label values that is offset from the beginning of the range of label values by the value of the VLAN identifier and uses the determined label value as the label value allocated for the VLAN identifier. For instance, assume that a network device is configured to reserve a defined range of label values of 10,000-12,000 for VLAN identifiers. For a VLAN identifier of 90 defined for a particular VLAN, the network device determines the label value of 10,090 as the label value allocated for the VLAN identifier. By configuring each network device that is to act as a single logical network device in such a manner, the network devices can allocate the same label value for the same VLAN identifier. As mentioned above, a network device provides an interface (e.g., a CLI, a GUI, etc.) for configuring the network device in some embodiments. In some such embodiments, the VLAN identifiers and the range of label values can be configured for a network device by sending appropriate commands via the interface provided by the network device.

The above method of allocating label values for VLAN identifiers is done on a VLAN basis. That is, different label values are allocated for different VLAN identifiers. Another method of allocating label values for VLAN identifiers is done on a group of VLAN identifier basis. In such a method, each of the network devices that are to act as a single logical network device is configured with the same defined groups of VLAN identifiers. A defined group of VLAN identifiers can be referred to as a bundle of VLAN identifiers. For example, a network device can be configured with a defined first group of VLAN identifiers that includes a VLAN identifier of 51 for a first VLAN, a VLAN identifier of 52 for a second VLAN, and a VLAN identifier of 53 for a third VLAN. The network device can be further configured with a defined second group of VLAN identifiers that includes a VLAN identifier of 54 for a fourth VLAN, a VLAN identifier of 55 for a fifth VLAN, a VLAN identifier of 56 for a sixth VLAN, and a VLAN identifier of 57 for a seventh VLAN. Then, for each defined group of VLAN identifiers, the network device is configured with a particular label value. As such, the network device allocates each VLAN identifier in a defined group of VLAN identifiers with the same configured label value. Continuing with the example, the network device may be configured with a label value of 500 for the first group of VLAN identifiers and may be configured with a label value of 501 for the second group of VLAN identifiers. Thus, the network device allocates the VLAN identifier of 51, the VLAN identifier of 52, and the VLAN identifier of 53 with the label value of 500. Similarly, the network device allocates the VLAN identifier of 54, the VLAN identifier of 55, the VLAN identifier of 56, and the VLAN identifier of 57 with the label value of 501. Configuring each of the network devices that are to act as a single logical network device in this manner allows the network devices to allocate the same label values to the same VLAN identifiers.

By configuring network devices that are to act as a single logical network device to have the same next hop IP address and to allocate the same label values for the same corresponding VLAN identifiers, other network devices in core network 145 (e.g., network device 120) use less entries to store routing information. For example, if the next hop IP addresses and/or the label value allocations for VLAN identifiers are different, the network devices would have to use separate entries in their hardware resources to store the information. However, with the same next hop IP address and the same label values allocated for VLAN identifiers, the network devices can use the same entry in their hardware resources to store the information, thereby reducing usage of the hardware resources of the network devices.

5. Example Process

Figure 5:
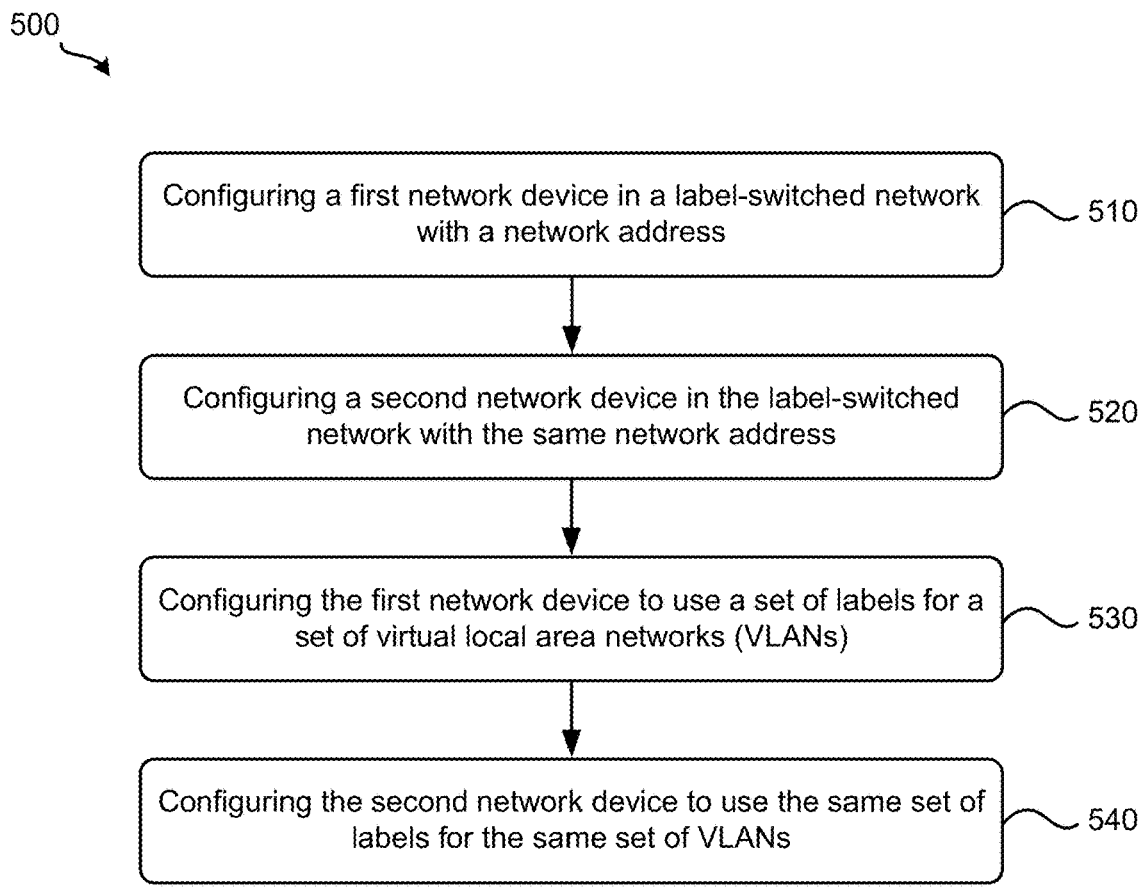
FIG. 5 illustrates a process for configuring network devices as a single logical network device according to some embodiments.

FIG. 5 illustrates a process 500 for configuring network devices as a single logical network device according to some embodiments. Process 500 starts by configuring, at 510, a first network device in a label-switched network with a network address. Referring to FIG. 1 as an example, network device 125 may be configured with an IP address of 2.2.2.2. The configured IP address is a next hop IP address that is used for a routing protocol that network device 125 utilizes to exchange routing information. For instance, when advertising a route, network device 125 includes the configured next hop IP address as part of the information included in the route.

Next, process 500 configures, at 520, a second network device in the label-switched network with the same network address. Referring to FIG. 1 as an example, network device 130 may be configured with the same IP address of 2.2.2.2. The configured IP address is a next hop IP address that is used for a routing protocol that network device 130 utilizes to exchange routing information. For example, when network device 130 advertises a route, the configured next hop IP address is included as part of the information in the route.

Process 500 then configures, at 530, the first network device to use a set of labels for a set of VLANs. Referring to FIG. 1 as an example, network device 125 may be configured with a set of labels for a set of VLANS. In some embodiments, network device 125 may be configured to use the method for allocating label values for VLAN identifier on a per VLAN basis. In other embodiments, network device 125 may be configured to use the method for allocating label values for VLAN identifier on a per VLAN group basis.

Finally, process 500 configures, at 540, the second network device to use the same set of labels for the same set of VLANs. Referring to FIG. 1 as an example, network device 130 can be configured with the same set of labels for the same set of VLANS. In some embodiments, network device 130 may be configured to use the method for allocating label values for VLAN identifier on a per VLAN basis. In other embodiments, network device 130 may be configured to use the method for allocating label values for VLAN identifier on a per VLAN group basis. By configuring the first and second network devices with the same network address and the same set of labels for the same set of VLANs, the configured first and second network devices can appear as a single logical network device from the perspective of other network devices in the label-switched network.

6. Example Network Device

Figure 6:
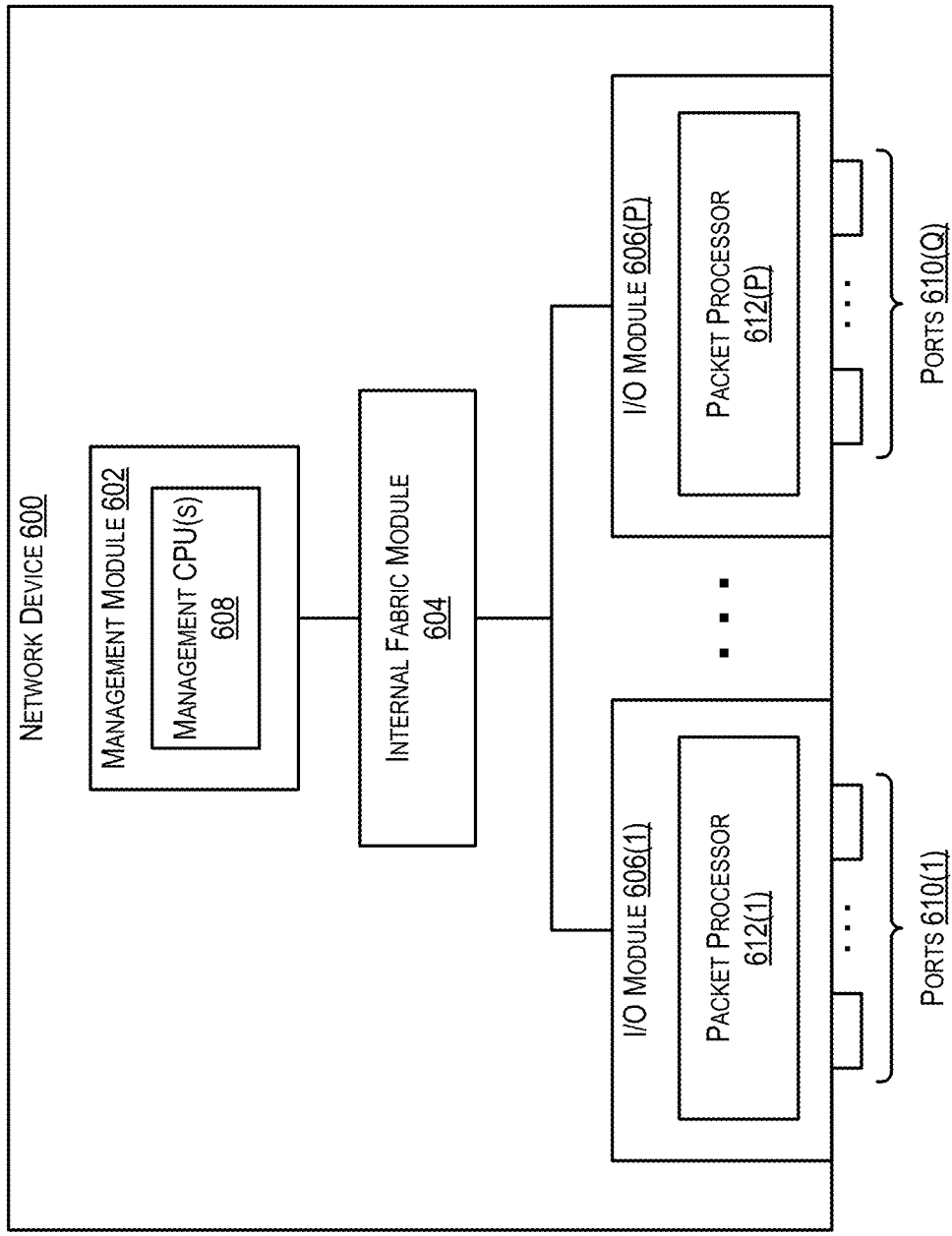
FIG. 6 illustrates an example network device according to certain embodiments.

FIG. 6 illustrates the architecture of an example network device (e.g., a network switch or router) 600 that may implement the techniques of the present disclosure according to certain embodiments. For example, network device 600 may correspond to network devices 115-135 shown in FIG. 1.

Network device 600 includes a management module 602, an internal fabric module 604, and a number of I/O modules 606(1)-(P). Management module 602 includes one or more management CPUs 608 for managing/controlling the operation of the device. Each management CPU 608 can be a general-purpose processor, such as an Intel/AMD x86 or ARM-based processor, that operates under the control of program code maintained in an associated volatile memory and/or stored in a non-transitory computer readable storage medium (not shown). In one set of embodiments, this program code can include code for implementing some or all of the techniques described in the foregoing sections.

Internal fabric module 604 and I/O modules 606(1)-(P) collectively represent the data, or forwarding, plane of network device 600. Internal fabric module 604 is configured to interconnect the various other modules of network device 600. Each I/O module 606 includes one or more input/output ports 610(1)-(Q) that are used by network device 600 to send and receive network packets. Each I/O module 606 can also include a packet processor 612, which is a hardware processing component that can make wire speed decisions on how to handle incoming or outgoing network packets.

It should be appreciated that network device 600 is illustrative and other configurations having more or fewer components than network device 600 are possible.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
   configuring a first network device in a label-switched network with a first network address that the first network device uses for exchanging routing information via a routing protocol with other network devices in the label-switched network;

configuring a second network device in the label-switched network with a second network address that the second network device uses for exchanging routing information via the routing protocol with other network devices in the label-switched network, wherein the first network address and the second network address are the same, wherein each of the first and second network addresses is a next hop network address that serves as a tunnel end point for implementing layer 2 routes over the label-switched network;

configuring the first network device to use a first set of labels to route traffic through the label-switched network for a first set of virtual local area networks (VLANs); and configuring the second network device to use a second set of labels to route traffic through the label-switched network for a second set of VLANs, wherein the first set of labels and the second set of labels are the same, wherein the first set of VLANs and the second set of VLANs are the same, wherein mappings between the first set of labels and the first set of VLANs are the same as mappings between the second set of labels and the second set of VLANs, wherein the configured first and second network devices appear as a logical network device from the perspective of other network devices in the label-switched network.

2. The method of claim 1 further comprising:

receiving, at the first network device, a first set of commands for specifying the first network address for the first network device; and receiving, at the second network device, a second set of commands for specifying the second network address for the second network device, wherein the first network device configures the first network device with the first network address in response to receiving the first set of commands, wherein the second network device configures the second network device with the second network address in response to receiving the second set of commands.

3. The method of claim 2, wherein the first set of commands are received through a first interface providing by the first network device for receiving commands for configuring the first network device, wherein the second set of commands are received through a second interface providing by the second network device for receiving commands for configuring the second network device.

4. The method of claim 1 further comprising:

receiving, at the first network device, a first set of commands for specifying the first set of labels the first network device is to use for the first set of VLANs; and receiving, at the second network device, a second set of commands for specifying the second set of labels the second network device is to use for the second set of VLANs, wherein the first network device configures the first network device to use the first set of labels for the first set of VLANs in response to receiving the first set of commands, wherein the second network device configures the second network device to use the second set of labels for the second set of VLANs in response to receiving the second set of commands.

5. The method of claim 4, wherein the first set of commands are received through a first interface providing by the first network device for receiving commands for configuring the first network device, wherein the second set of commands are received through a second interface providing by the second network device for receiving commands for configuring the second network device.

6. The method of claim 4, wherein the first set of commands comprises a first subset of the first set of commands for defining a first range of label values and a second subset of the first set of commands for defining a first set of identifiers for the first set of VLANs, wherein the second set of commands comprises a first subset of the second set of commands for defining a second range of label values and a second subset of the second set of commands for defining a second set of identifiers for the second set of VLANs, wherein the first range of label values and the second range of label values are the same, wherein the first set of identifiers and the second set of identifiers are the same.

7. The method of claim 6 further comprising:

for each VLAN in the first set of VLANS, allocating, by the first network device, a first label value from the first range of label values based on a first value of the identifier defined for the VLAN; and for each VLAN in the second set of VLANS, allocating, by the second network device, a second label value from the second range of label values based on a second value of the identifier defined for the VLAN.

8. The method of claim 7, wherein the first network device allocates, for each VLAN in the first set of VLANS, the label from the first range of labels by determining a label value in the first range of label values that is offset from a beginning of the first range of label values by the first value of the identifier defined for the VLAN and using the determined label value in the first range of label values as the first label value allocated for the VLAN, wherein the second network device allocates, for each VLAN in the second set of VLANS, the second label from the second range of labels by determining a label value in the second range of label values that is offset from a beginning of the second range of label values by the second value of the identifier defined for the VLAN and using the determined label value in the second range of label values as the second label value allocated for the VLAN.

9. The method of claim 4, wherein the first set of commands comprises:

a first subset of the first set of commands for defining a first group of VLANS comprising a first subset of the first set of VLANs and a second group of VLANS comprising a second subset of the first set of VLANS, and a second subset of the first set of commands for defining a first identifier for the first group of VLANs and a second identifier for the second group of VLANs, wherein the second set of commands comprises:

a first subset of the second set of commands for defining a third group of VLANS comprising a first subset of the second set of VLANs and a fourth group of VLANS comprising a second subset of the second set of VLANS, and a second subset of the second set of commands for defining a third identifier for the third group of VLANs and a fourth identifier for the fourth group of VLANs, wherein the first subset of the first set of VLANs and the first subset of the second set of VLANs are the same, wherein the second subset of the first set of VLANS and the second subset of the second set of VLANs are the same.

10. The method of claim 9 further comprising:
for each VLAN in the first subset of the first set of VLANS, allocating, by the first network device, the first identifier for the VLAN;
for each VLAN in the second subset of the first set of VLANS, allocating, by the first network device, the second identifier for the VLAN;
for each VLAN in the first subset of the second set of VLANS, allocating, by the second network device, the third identifier for the VLAN; and
for each VLAN in the second subset of the second set of VLANS, allocating, by the second network device, the fourth identifier for the VLAN.

11. The method of claim 1 further comprising:
receiving, by the first network device, data comprising a label;
performing a lookup on a forwarding table of the first network device, the forwarding table comprising a set of entries, each entry in the set of entries comprising an identifier associated with a VLAN, a network address, and an interface of the first network device; and
forwarding the data out a particular interface of the first network device based on the lookup.

12. The method of claim 11 further comprising, before forwarding the data, decapsulating, by the first network device, the label from the data.

13. The method of claim 1 further comprising:
receiving, by the second network device, data comprising a label;
performing a lookup on a forwarding table of the second network device, the forwarding table comprising a set of entries, each entry in the set of entries comprising an identifier associated with a VLAN, a network address, and an interface of the second network device; and
forwarding the data out a particular interface of the second network device based on the lookup.

14. The method of claim 13 further comprising, before forwarding the data, decapsulating, by the second network device, the label from the data.

15. The method of claim 1 further comprising:
configuring the first network device and the second network device as a multi-chassis link aggregation (MLAG) pair; and
configuring an MLAG peer link between the first network device and the second network device, the MLAG peer link for synchronizing state with each other.

16. The method of claim 15 further comprising:
configuring a first port of the first network device as a first port channel coupled to a network device; and
configuring a second port of the second network device as a second port channel coupled to the network device, wherein the first and second port channels are configured to form a single logical port channel connected to the network device.

17. The method of claim 16, wherein bandwidth of the first and second port channels are configured to be simultaneously utilized.

18. The method of claim 1, wherein the next hop address is a first next hop address, the method further comprising:
learning, by the first network device, a route through a network comprising the first network device, the second network device, and the label-switched network; and
advertising, by the first network device, the route to other network device in the label-switched network, wherein a second next hop network address include in the advertised route comprises the configured first network address for the first network device.

19. The method of claim 1, wherein the first network device advertises a layer 2 route via the routing protocol to other network devices in the label-switched network, the layer 2 route specifying the first network address as a next hop network address of the layer 2 route.

20. A system comprising:
a first network device in a label-switched network, the first network device configured with a first network address that the first network device uses for exchanging routing information via a routing protocol with other network devices in the label-switched network, the first network device further configured to a first set of labels to route traffic through the label-switched network for a first set of virtual local area networks (VLANs); and
a second network device in the label-switched network, the second network device configured with a second network address that the second network device uses for exchanging routing information via the routing protocol with other network devices in the label-switched network, wherein the first network address and the second network address are the same, the second network device further configured to use a second set of labels to route traffic through the label-switched network for a second set of VLANs,
wherein each of the first and second network addresses is a next hop network address that serves as a tunnel end point for implementing layer 2 routes over the label-switched network, wherein the first set of labels and the second set of labels are the same, wherein the first set of VLANs and the second set of VLANs are the same, wherein mappings between the first set of labels and the first set of VLANs are the same as mappings between the second set of labels and the second set of VLANs, wherein the configured first and second network devices appear as a logical network device from the perspective of other network devices in the label-switched network.

* * * * *